Sept. 30, 1969    J. G. ENDRES ET AL    3,469,996
PROCEDURE FOR CONTINUOUSLY TEMPERING SHORTENING
Filed Feb. 14, 1966    2 Sheets-Sheet 1

INVENTORS
Joseph G. Endres
Raymond J. Wrobel
Robert B. Rendek

Carl C. Batz
Atty.

Sept. 30, 1969　　　J. G. ENDRES ET AL　　　3,469,996
PROCEDURE FOR CONTINUOUSLY TEMPERING SHORTENING
Filed Feb. 14, 1966　　　　　　　　　　　　2 Sheets-Sheet 2

INVENTORS
Joseph G. Endres
BY Raymond J. Wrobel
Robert B. Rendek

Carl C. Batz
Atty.

United States Patent Office 3,469,996
Patented Sept. 30, 1969

3,469,996
PROCEDURE FOR CONTINUOUSLY TEMPERING SHORTENING
Joseph G. Endres, Downers Grove, Raymond J. Wrobel, Chicago, and Robert B. Rendek, Hillside, Ill., assignors to Armour and Company, Chicago, Ill., a corporation of Delaware
Filed Feb. 14, 1966, Ser. No. 527,355
Int. Cl. A23d 5/03
U.S. Cl. 99—118          3 Claims

ABSTRACT OF THE DISCLOSURE

A more uniform tempered shortening is produced by supercooling molten shortening triglycerides to crystallization and then quick heating them with microwaves.

---

This invention relates to tempered shortening and more particularly to a fast method for a more uniform treatment of shortening triglycerides to impart more uniform desirable plasticity, creaming volume and uniformity to the product.

The preferred shortenings of today are those which reach the consumer in the form of a somewhat soft plastic solid; and since the fats which go into shortenings vary greatly in consistency with changes in temperature, a problem which continually faces shortening producers is that of providing the consumer with shortening which is within the desired "plastic range" in spite of having passed through the rather substantial variations in temperature which are inevitable in the handling and storage of the products between the time they leave the producer and reach the consumer.

The existing method employed by the industry in meeting the above problem makes use of the fact that shortening triglycerides, which are crystallized from the molten state and then stored or "tempered" at 75–85° F. for 24 hours or more, tend to have a desired consistency or plasticity at use temperatures, in spite of having passed through any of the normally encountered vicissitudes of temperature. The tempering for a minimum period of time within the above temperature range is considered essential.

Thus, it is common practice in the industry to make up the desired triglyceride mixture in melted form and then supercool it rapidly from the molten state to below the solidifying point of the fat. This is done conventionally in an apparatus known as a Votator, according to the process which is described in detail on pages 1063 to 1072 of A. E. Bailey's book "Industrial Oil and Fat Products," 3rd Ed. (Interscience Publishers, Inc., New York, 1964). In the Votator unit, the melted fat is pumped through a series of externally chilled tubes which are provided with internal rotating blades which remove the thin film of chilled material from the walls of the tubes. After this, the supercooled fat is passed to another series of tubes (called "B" units) where the process of solidification or crystallization is continued under moderate agitation caused by beaters within the tubes. This is followed by packaging and then tempering for a prolonged period, as described above.

In the above procedure, the liquified shortening triglycerides are first subjected to supercooling conditions resulting in partial crystallization and are then passed to the "B" unit of the Votator, where further crystallization takes place until the point of maximum crystallization has been reached. Following the point at which maximum crystallization has been achieved, and particularly during the tempering step which follows, certain changes take place. It appears that a process of crystal melting and recrystallization begins and continues along with the establishment of certain cohesive forces between the crystals. Beyond this, however, it seems certain that a specific kind of polymorphic transformation is effected. Thus, using the nomenclature recommended by Ferguson and Lutton, J.A.C.S., 67, 254 (1945), it appears that rapid chilling of the liquified shortening triglycerides initially produces crystals in the alpha form. Since the alpha crystalline form is of a rather transitory nature, it appears further that a substantial portion of the triglyceride mass has changed to the beta prime crystalline form by the time the point of maximum crystallization has been achieved, and that the prolonged tempering step which follows is marked by a slow completion of the transformation to the normal polymorphic crystalline state, depending upon the particular type of shortening involved.

The shortening industry originally regarded the prolonged tempering step as an essential element, without which it would be impossible to produce a shortening meeting the desired standards of consistency, creaming volume, and resistance to subsequent changes in ambient temperatures. Although the exact reasons for the effectiveness of the tempering step have not been well defined, it had been assumed in the trade that it was necessary to hold the shortening for a prolonged period of time in order to allow the desired changes to take place in an orderly fashion. Consequently, shortening plants were usually provided with special tempering rooms, in which all newly filled products were held for a period of about 48 hours at about 85° F. before they were shipped.

Recently, as seen in U.S. 3,117,011, resort to "quick tempering" has been had, but with only moderate success. This was due to the discovery that each individual crystal in a newly crystallized mass of shortening could be brought almost instantaneously to its desired final form merely by heating and without the need for a prolonged tempering period. When applied to a large mass of triglyceride crystals, the tempering step could be eliminated provided the heating was carried out under conditions such that the temperature of all the individual crystals was uniformly raised to the desired point, and provided the triglycerides are not unduly agitated during the heating or subsequent step to carry the crystal transformation beyond the normal polymorphic crystalline state or disrupt the overall crystal structure.

Unfortunately, the need for a thin quiescent layer, in one technique, is prohibitive from a mass production viewpoint. And dielectric heat treatment is not completely satisfactory because of channeling; that is, there is a heavier passage of dielectric current through certain channels, generally of higher moisture content, so that non-uniform heating occurs. Also, the means employed, namely flow through a plastic tube fitted with elongated electrodes, is not conducive to uniformity. The flow is imperfect, thus causing over- and under-treatment of the shortening.

Accordingly, an object of this invention is to provide a novel process for the quick tempering of shortening.

Another object is to provide a quick tempering process which is uniform.

Still another object is to provide a quick tempering process which is economical.

A further object is to provide an improved form of shortening.

A still further object is to provide a more uniformly tempered shortening.

Other objects of the invention will in part be obvious and will in part appear hereinafter.

It has now been found that the tempering of shortening with microwave energy produces a substantially improved product in a more economical manner. More particularly, by subjecting supercooled shortening to a microwave heat treatment, either in batch or continuous fashion, for about one minute, a tempered shortening results which is more uniform and better in quality than any heretofore produced even though the treatment is more economical.

The invention accordingly comprises the several steps and the relation of one or more of such steps with respect to each of the others, and the product possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
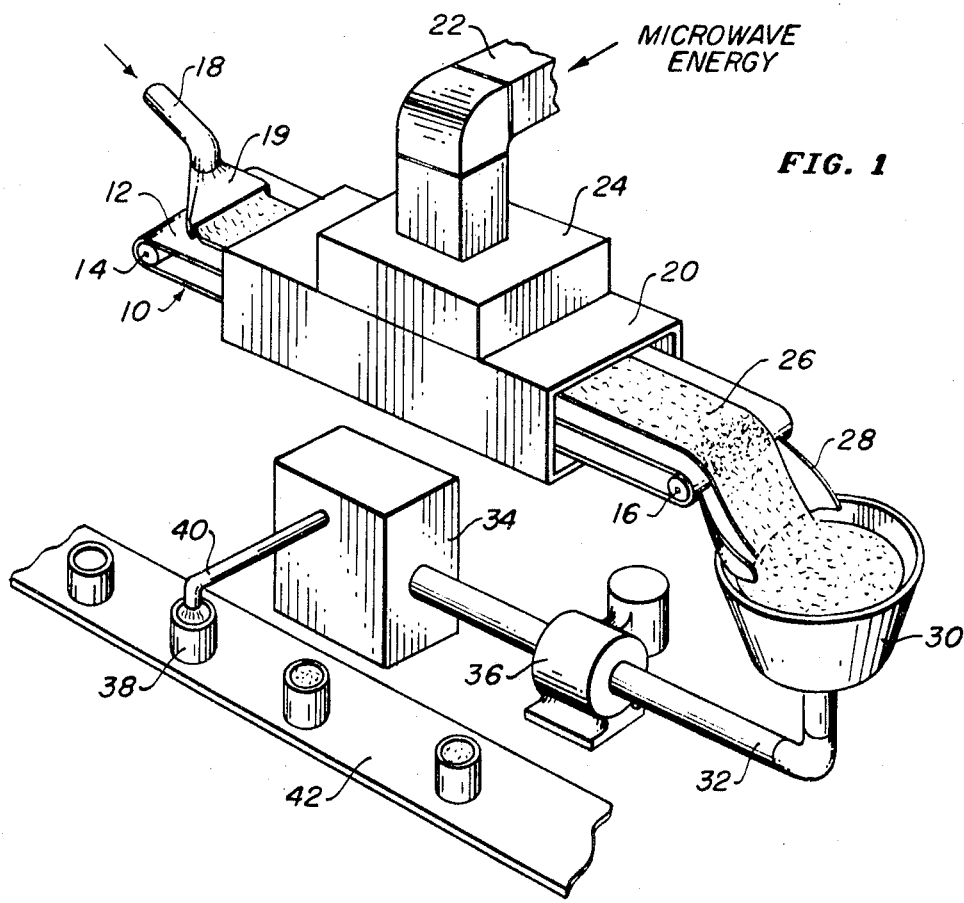
FIG. 1 is a perspective view of one embodiment of apparatus for tempering shortening on a continuous process basis.
Figure 2:
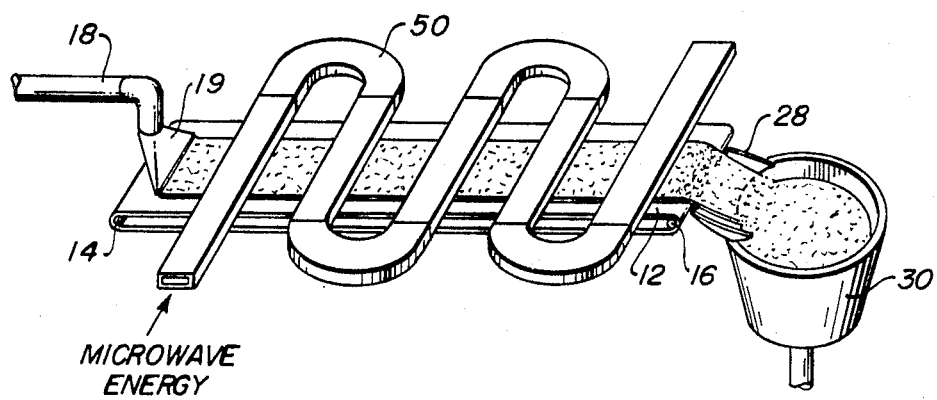
FIG. 2 is a perspective view of another embodiment of apparatus for continuous process tempering.
Figure 3:
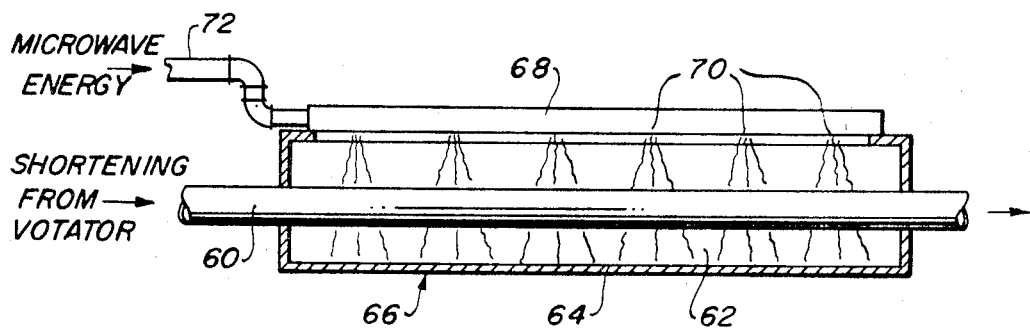
FIG. 3 is a side cross-sectional view of still another embodiment of apparatus for tempering on a continuous scale.
Figure 4:
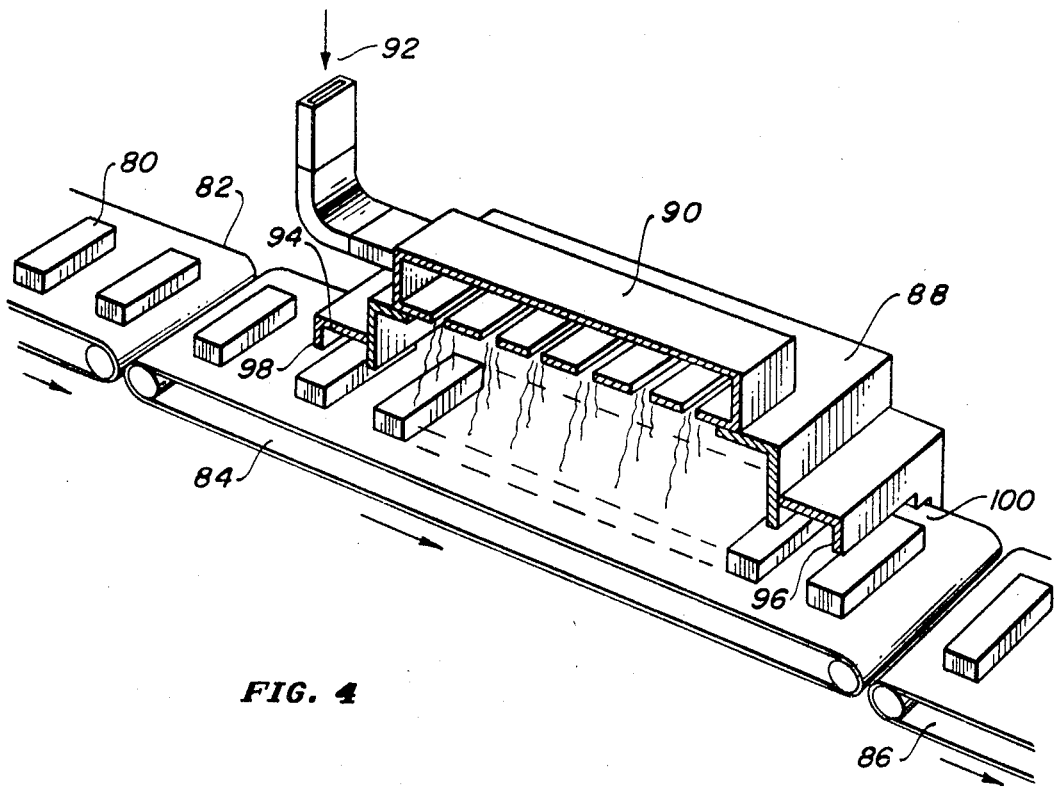
FIG. 4 is a perspective view of still another embodiment of apparatus wherein packages of shortening are tempered.

As seen in FIGS. 1 to 4, the apparatus that could be used varies dependent upon batch or continuous processing. FIGS. 1 and 2 show conveyor type apparatus while FIG. 3 shows a conduit type apparatus for continuous tempering. FIG. 4 shows apparatus for batch tempering; specifically, tempering of shortening already packed for sale to the consumer.

Referring now to FIG. 1, there is shown a conveyor means 10 such as an endless belt 12 which travels around two spaced rollers 14 and 16. At least one of the rollers is powered so that the belt may be driven.

Shortening from a Votator is fed onto the belt in spread fashion via conduit 18 and spreader nozzle 19. The belt passes through microwave oven 20 into which microwave energy has been directed via wave guide 22 and manifold slotted wave guide 24. The slots therein are not shown since they open downwardly into the interior of the oven to spread the energy evenly across the interior thereof. The microwave energy heats the shortening to effect crystal transformation to the desired polymorphic state. Such transformation occurs during the short pass through the oven (usually less than one minute).

After treatment, the tempered shortening 26 is collected via doctor knife collector 28 and funneled into sump 30. The sump 30 drains via drain pipe 32 and pump 36 to a filling machine 34. The filling machine intermittently loads containers 38 which are presented to filling machine nozzle 40 via energized conveyor 42.

The amount of microwave energy supplied to oven 20 depends upon the speed of the belt, the amount of shortening fed to the oven, and the absorption characteristics of the oven.

Since transformation to the polymorphic state is immediate, no special storage of the packed shortening containers is required after treatment.

FIG. 2 shows apparatus which is basically the same except for the microwave oven. As seen therein, instead of a tubular oven, there is used a zig-zag wave guide 50 having slots on the undersurface thereof (not shown) immediately over the belt. Thus the energy is directed solely toward the shortening being treated as the belt moves to the right. When fully processed, doctor knife collector 28 gathers the shortening and feeds it into sump 30 which communicates with a filling machine as shown in FIG. 1.

In FIG. 3, the apparatus takes on a continuous tube configuration passing through a microwave oven. As illustrated, the shortening from the Votator is pumped through a low loss tube 60, which may comprise glass, plastic, and the like. The tube is surrounded by the microwave oven chamber 62 which may be a resonant or a non-resonant cavity. The oven is fed with microwave energy via a slotted wave guide 68 having slots 70 on its undersurface to spread the energy evenly along the entire length of the oven. The energy is fed from source 72 which may comprise a microwave generator. Crystal transformation of the shortening to its polymorphic state occurs while the shortening is conveyed through low loss tube 60. It may then be conveyed directly to a filling machine or to an accumulator or surge tank which in turn feeds the filling machine.

FIG. 4 illustrates still another variation of apparatus, but here it is designed for batch treatment of the shortening. Prior to treatment, the shortening is packed in low loss containers 80. Feed conveyor means 82, oven conveyor means 84 and outlet conveyor means 86, each of which may comprise an endless belt, a vibratory chute, a roller conveyor or the like, transport the shortening-filled containers to, through and away from the microwave oven 88.

The oven has the usual chamber configuration with a slotted wave guide 90 acting to direct microwave energy from source 92, evenly into the chamber. The oven also has inlet and outlet tunnels 98 and 100 so designed with energy absorbing material, that injury to personnel is prevented. Varying the size of the apertures of the inlet and outlet tunnels in accord with the different size packages being treated will minimize loss of microwave energy.

A microwave oven that may be employed is one manufactured by Cryodry Corporation of San Ramon, Calif. It should be operated at about 915 to 2450 megacycles at a power setting of about 0.003–0.006 kilowatt hours per pound of shortening (k.w.h./lb.). Usually, the oven is operated at 915 megacycles at a power setting of 22 kilowatts.

The time of treatment may range from one-fourth to ten minutes, and preferably no more than two minutes.

Reference is now made to specific examples which illustrate the invention in detail.

EXAMPLE I

Two batches of an unemulsified meat fat shortening called "Purity," plasticized in a Harrington plasticizer, are passed through a microwave oven such as shown in FIG. 4 of the drawing operated at 915 megacycles at a power setting of about 22 kilowatts. Retention time in the oven was about 1.5 minutes.

In the first batch, shortening is plasticized into paper trays of 10" x 8" x 1" size, about 2 pounds per tray. The trays are passed through the microwave oven. Upon a complete pass, the temperature of the shortening usually ranges from 95–103° F.

The shortening is then cooled to 70° F. and used, immediately, after 24 hours storage, and after 48 hours storage, in the baking of pound cakes. A conventionally tempered control is used. This involves the use of shortening triglycerides, which are crystallized from the molten state and then stored or "tempered" at 85° C. for 24 hours or more.

The formula involved in the baking of pound cakes is as follows:

(1) Fine granulated sugar _____lb__ 1
    All purpose shortening _____oz__ 8
    Nonfat dry milk _____oz__ 0.75
(2) Salt _____oz__ 0.50
    Whole eggs _____oz__ 8
(3) Distilled water _____oz__ 7.25
    Cake flour _____oz__ 4
(4) Cake flour _____oz__ 12

Mixing procedure

Cream No. 1 on medium speed 550 revolutions in a N-50 Hobart mixer using the 5 qt. bowl. Add No. 2 continuously while creaming on medium speed from 550 to 1100 revolutions. Continue to cream on medium to 2300 revolutions. Reduce speed to low. Add No. 3. Continue low speed mixing to 2500 revolutions. Add No. 4. Mix on low speed to 2720 revolutions.

Pound cake volumes are calculated from batter specific gravity using the following formula:

(batter specific volume$\times$200)$-$10
= pound cake volume in c.c./100 gms.

The results are shown in Table 1 below. It will be noted from Table 1 that there is no change in performance in pound cake bake-out when the microwave tempered shortenings are held for more than 24 and 48 hours. This implies that microwave tempering is irreversible.

TABLE 1

| Sample | Immediate Bake Out | After 24 Hours | After 48 Hours |
|---|---|---|---|
| 1 | 257 cc./100 gms | 259 cc./100 gms | 257 cc./100 gms |
| 2 | 266 cc./100 gms | 267 cc./100 gms | 265 cc./100 gms |
| 3 | 263 cc./100 gms | 261 cc./100 gms | 264 cc./100 gms |
| 4 | 265 cc./100 gms | 265 cc./100 gms | 264 cc./100 gms |
| No temper | 223 cc./100 gms | 224 cc./100 gms | 225 cc./100 gms |
| Control | | 273 cc./100 gms | 270 cc./100 gms |

In the second batch, polyethylene bags, 3″ in diameter and 20″ long, are filled with Purity from the Harrington plasticizer and passed through the microwave oven. The shortening at the center of the bag will be heated to about 100° F. Results are shown in Table 2:

TABLE 2

| Sample | Immediate Bake Out | After 24 Hours | After 48 Hours |
|---|---|---|---|
| No temper | 229 cc./100 gms | 230 cc./100 gms | 230 cc./100 gms |
| 3 | | 259 cc./100 gms | 260 cc./100 gms |
| 4 | 253 cc./100 gms | 260 cc./100 gms | 259 cc./100 gms |
| Control | | | 270 cc./100 gms |

EXAMPLE II

Eight pounds of shortening in a cardboard box, dimensions 2¼″ x 10″ x 17″, with polyethylene liner are treated by passage through a microwave oven. Pound cake volume of the control is 270, the microwave heated product is 270, and the product with no temper is 220 c.c./100 gms. It is evident that improvement occurs.

The shortening that may be treated via the process of this invention may include tallow, mutton, pork, fowl, equivalent meat shortenings, and vegetable shortenings with and without emulsifiers.

It will thus be seen that the objects set forth above, among those made apparent from the preceding description, are efficiently attained, and, since certain changes may be made in carrying out the above method and in the product set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A process for producing an improved tempered shortening comprising supercooling molten shortening triglycerides to effect crystallization and then subjecting the supercooled triglycerides to a quick microwave heat treatment in a microwave chamber operated at about 915 to 2450 megacycles at a power setting of about 0.003–0.006 kw. h./lb. for about one-fourth to ten minutes whereby an improved, more uniform tempered shortening is produced.

2. The process of claim 1 wherein said triglycerides are treated in a continuous manner by flowing them therough a tube passing through said microwave chamber.

3. The process of claim 1 wherein said triglycerides are treated in bulk via the use of a microwave transparent container which passes through said chamber.

References Cited

UNITED STATES PATENTS 2,117,011   1/1964   Hoerr et al. _____ 99—118
3,192,056   6/1965   Williams _____ 99—229

OTHER REFERENCES

Copson, David A.: "Microwave Heating," 1962, Avi Publ. Co., Westport, Conn., pp, 7, 11, 12, 20–22, 371–373, 397, 398.

MAURICE W. GREENSTEIN, Primary Examiner

U.S. Cl. X.R.

99—122, 217